LOSS OF ACTIVE CHLORINE FROM CHLORINATED
CYANURIC ACID CONTAINING 4 TO 45% CHLORINE
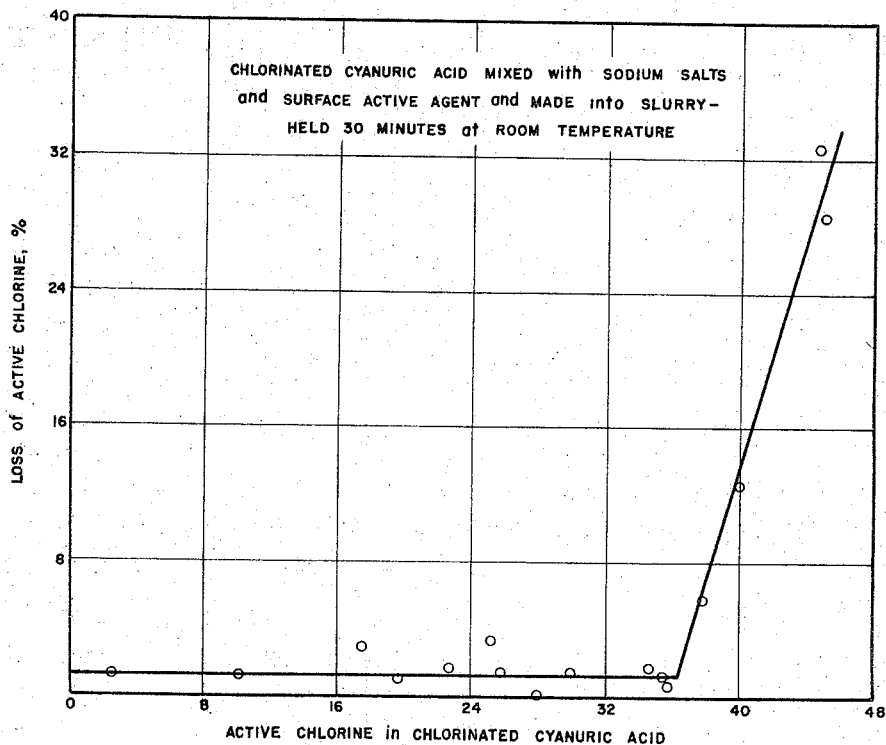
INVENTORS.
ROBERT J. FUCHS
RAYMOND A. OLSON
BY Milton Zucker
ATTORNEY.

3,336,228
ACTIVE CHLORINE COMPOSITIONS CONTAINING DICHLOROCYANURIC ACID AND SALTS THEREOF

Robert J. Fuchs, Clark Township, and Raymond A. Olson, Westfield, N.J., assignors to FMC Corporation, a corporation of Delaware
Filed Mar. 1, 1957, Ser. No. 643,458
5 Claims. (Cl. 252—99)

This application is a continuation-in-part of application Serial No. 507,115 filed May 9, 1955, and application Serial No. 620,186 filed Nov. 5, 1956, both abandoned.

The invention of this application relates to new bleaching, sanitizing, and other compositions containing dichlorocyanuric acid or salts thereof as a source of active chlorine.

Various compounds are known which contain "active" chlorine, i.e., chlorine which has oxidizing properties similar to those of elemental chlorine. Such compounds usually contain a chlorine atom attached to an oxygen atom or to a nitrogen atom. Compounds of this type are useful in industrial textile bleaching, as germicides, as constituents of bleaching, sanitizing and detergent compositions, and for other purposes.

The term "available chlorine" is sometimes used rather than "active chlorine" in referring to these compounds. The same type of chlorine is designated by the two terms, but when expressed quantitatively "active chlorine" indicates the chlorine actually present, while "available chlorine" indicates the amount of elemental chlorine to which the chlorine in the compound is equivalent in terms of oxidizing power. The numerical value for available chlorine content is twice that for active chlorine.

One of the commonest and most effective active chlorine compounds is sodium hypochlorite. This compound as well as other alkali metal hypochlorites has the disadvantage that it is stable only in relatively dilute solution. This necessitates handling a weight and bulk of material many times that of the contained active chlorine. Also, for many purposes it is desirable to have a dry pulverulent active chlorine composition rather than a liquid.

Another well-known source of active chlorine is calcium hypochlorite and this compound has been prepared in dry form with a relatively high content of active chlorine and has been produced commercially to some extent. However, it is unstable under certain conditions, and the presence of calcium is objectionable in many cases where the material is used in aqueous solution, since it adds to the hardness of the water.

Various solid organic compounds containing active chlorine or other halogen have been suggested for use in dry formulations, and some of them have found limited application. These include N,N-dichloro-azo-carbonamidine, N,N'-dichlorodimethylhydantoin, chlorinated amides of cyanuric acid, trichlorocyanuric acid, and others. None of these has been entirely satisfactory for commercial production and use. One of the principal defects has been lack of adequate stability during formulation into commercial preparations and during storage. Other deficiencies have been high cost of manufacture and low solubility. The problem of providing a dry composition for household and industrial bleaching and sanitizing has received much attention in the past, but the prior art has not supplied a satisfactory solution.

It is an object of this invention to provide new compositions containing new active chlorine compounds.

Another object is to provide active chlorine compositions with improved stability in both dry and solution form.

Another object is to provide active chlorine compositions having improved solubility characteristics.

Another object is to provide active chlorine compositions which can be slurried or moistened in the presence of other materials and dried, as by spray drying, without appreciable loss of chlorine, to produce free-flowing, dust-free, stable, active chlorine compositions suitable for household use.

Other objects and advantages of the invention will be apparent as the description proceeds.

Trichlorocyanuric acid has been known for many years and the preparation of dry formulations containing it, for use in bleaching and other applications requiring active chlorine, has been proposed in U.S. Patent No. 2,607,738. However, this compound has certain characteristics which have prevented its use in commercial active chlorine compositions except in a very limited way.

It has now been found that it is possible to prepare a chlorinated cyanuric acid containing two atoms of chlorine per molecule and that this compound is an excellent source of active chlorine for use in dry formulations.

It has also been found that the new chlorinated cyanuric acid can be converted to salts and that some of the latter are more suitable than the acid compound for certain purposes.

The term "dichlorocyanurate compound" as used herein refers to dichlorocyanuric acid and salts of this compound.

Dichlorocyanuric acid may be prepared by adding elemental chlorine to an alkaline solution of cyanuric acid under controlled reaction conditions, as illustrated by the following equation:

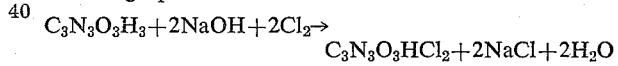

$C_3N_3O_3H_3 + 2NaOH + 2Cl_2 \rightarrow$
$\qquad C_3N_3O_3HCl_2 + 2NaCl + 2H_2O$ Cyanuric acid is commonly represented as existing in two tautomeric forms as follows:

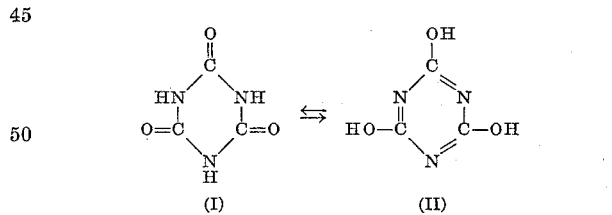

(I)          (II)

The formation of dichlorocyanuric acid and salts of the acid may be illustrated as follows, using structure II:

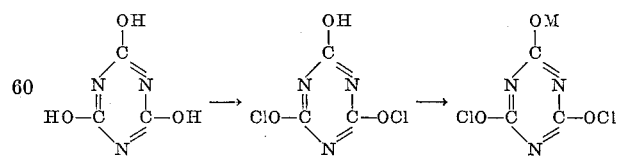

The dichlorocyanuric acid may be obtained as well-formed crystals by crystallization from an acid aqueous solution or from various organic solvents such as acetone, acetonitrile, etc. The theoretical active chlorine content is 35.8%, compared with 45.2% for trichlorocyanuric acid.

It will be observed that when cyanuric acid is converted to the trichloro compound, no hydrogen remains in the molecule and hence the formation of salts of the compound is not possible.

Surprisingly, attempts to prepare crystalline monochlorocyanuric acid, which theoretically has a chlorine content of 21.7%, by the procedure described above have been unsuccessful. The product obtained when the amount of chlorine introduced is less than that required to convert all the cyanuric acid to the dichloro compound appears to consist only of unchlorinated material and dichlorocyanuric acid. Presumably the introduction of one chlorine increases the reactivity to such an extent that a second chlorine enters the molecule immediately. However, the introduction of the third chlorine can be achieved only with considerable difficulty.

The preferred method of preparation of dichlorocyanuric acid and mixtures containing it involves dissolving cyanuric acid in a relatively dilute solution of an alkali, such as sodium hydroxide, containing approximately two equivalents of alkali for each mole of cyanuric acid, and then adding two moles of chlorine per mole of cyanuric acid to the solution at a relatively low temperature, such as 5° C., at a rate that permits absorption of substantially all of the chlorine. The alkali is neutralized as the chlorination progresses, and very little chlorination occurs after chlorine equivalent to the alkali present has reacted. This fact facilitates control of the chlorination, since the alkali added can be measured more easily than gaseous chlorine.

Dichlorocyanuric acid, although more soluble than either cyanuric or trichlorocyanuric acid, has limited solubility in neutral or acid solution, and the product therefore precipitates as the alkali is exhausted during the chlorination. The chlorinated material is obtained in good yield by filtering off the precipitated product and washing to remove adhering mother liquor.

If desired, a considerable excess of alkali may be used and the chlorination terminated when two moles of chlorine per mole of cyanuric acid has reacted. When an excess is used the chlorine dissolves and reacts more readily and a higher average rate of chlorination may be obtained. After the chlorination is stopped the excess alkali is neutralized with an acid such as hydrochloric acid to cause the product to more completely precipitate from the solution.

In place of a free alkali in the reaction solution, alkaline salts, such as alkali metal carbonates, may be used to maintain the alkalinity of the solution. The concentration of the alkaline solution may vary over a considerable range. An initial concentration of about 7 to 8% is preferred.

The temperature of the solution in which the chlorination is carried out may vary from the freezing point upward to approximately 100° C. When operating in the upper part of this range, chlorination under pressure is desirable in order to obtain good utilization of the chlorine. A temperature of about 5° to 25° C. is preferred when operating at atmospheric pressure.

Another method of preparation of dichlorocyanuric acid involves the use, in place of free chlorine, of an inorganic hypochlorite, such as sodium hypochlorite, or an organic hypochlorite, such as tertiary butyl hypochlorite. Other compounds that readily yield chlorine or hypochlorite ion may also be used.

Dichlorocyanuric acid may also be formed by mixing trichlorocyanuric acid with cyanuric acid, preferably in an aqueous medium. Under these conditions the trichlorocyanuric acid gives up one third of its chlorine and this chlorine converts the cyanuric acid to dichlorocyanuric acid. Similarly, salts of dichlorocyanuric acid may be prepared by mixing trichlorocyanuric acid with a salt of cyanuric acid.

The cyanuric acid used to prepare chlorinated cyanuric acid may be prepared by heating urea to a temperature at which it loses ammonia, or by other known methods.

Salts of dichlorocyanuric acid may be prepared by mixing hydroxides, oxides, or salts of various metals with the acid in an aqueous or other liquid medium. Insoluble salts may be prepared by adding the proper metal compound to a solution of a soluble salt, such as the sodium salt, of dichlorocyanuric acid.

Salts of dichlorocyanuric acid may also be prepared directly by chlorinating cyanuric acid in the presence of the hydroxide, oxide, or certain salts of the desired metal. Evaporation of water from the chlorination mixture yields a mixture of the salt of dichlorocyanuric acid and the corresponding metal chloride. The two salts may be separated by suitable means. For some purposes, such as for the preparation of mixtures containing both sodium dichlorocyanurate and sodium chloride, it is not necessary to separate the salt of dichlorocyanuric acid from the corresponding metal chloride. Insoluble salts may be precipitated from the chlorination mixture by adding a suitable compound of a metal forming an insoluble salt with the dichloro acid.

Dichlorocyanuric acid has a higher solubility than trichlorocyanuric acid and this gives the former a definite advantage over the latter in applications where solutions having a high concentration of active chlorine are required, and also where a high rate of dissolution of the compound is needed. Alkali metal salts of dichlorocyanuric acid, particularly the sodium and potassium salts, and also the calcium salt, are even more soluble than the acid itself and they are preferred for this reason in some applications. The greater rate at which sodium dichlorocyanurate dissolves, compared with dichlorocyanuric acid, trichlorocyanuric acid, and dichlorodimethylhydantoin is shown in Example VI.

It has been found that some detergent solutions containing trichlorocyanuric acid evolve traces of irritating and lachrymatory substances. The identity of these substances is not known but it is believed that they may be chlorinated nitrogen compounds such as chloramines, nitrogen trichloride, cyanogen chloride, etc., which are known to be lachrymators. The irritating substances are also produced to some extent by dichlorocyanuric acid. They can be reduced in intensity by purifying the acid or altering the formulation. However, it was unexpectedly discovered that the irritants are not observed when sodium dichlorocyanurate and other salts of the acid are used, even when they are made from acid which itself produces the irritants. This gives the dichlorocyanurate compounds a very important and unexpected advantage over trichlorocyanuric acid in laundering, dishwashing, bleaching, scouring, and sanitizing compositions for household and other uses where personnel might be affected.

As indicated previously, it is not possible to convert trichlorocyanuric acid to a salt, and hence this important means of increasing the solubility and removing odor-forming tendencies cannot be applied to this compound.

It has been found that dichlorocyanurate compounds have a major advantage over trichlorcyanuric acid and other prior art active chlorine compounds in their outstanding stability with respect to chlorine loss. To be effective, an active chlorine compound must necessarily release chlorine when used in bleaching, sanitizing, and other applications, but loss of chlorine during manufacturing, formulating, and storage is a very serious disadvantage. Loss of chlorine results in economic loss, corrosion, and danger to personnel. Instability has prevented commercial use of certain active chlorine compounds that are otherwise very desirable. In contrast, dichlorocyanurate compounds have been found to have excellent stability, in both the dry state and in the presence of moisture.

The great stability of dichlorocyanuric acid compared with trichlorocyanuric acid is shown by the data plotted in FIGURE 1. The abscissae in this graph represent the chlorine content of cyanuric acid chlorinated to various degrees up to the trichlorocyanuric acid point and the ordinates represent the percentage of the active chlorine initially present which was lost under test conditions (described under Example IX). The figure shows excellent stability for dichlorocyanuric acid and mixtures of dichlorocyanuric acid with cyanuric acid in the presence of water, and poor stability for cyanuric acid chlorinated beyond the dichloro point, with a sharp break in stability at this point.

Stability of mixtures containing active chlorine compounds is very important, as loss of active chlorine during storage results in a decrease in bleaching, sterilizing, sanitizing, and chlorinating ability. Also, when unstable active chlorine compositions are packaged in ordinary paper containers, the chlorine liberated during storage diffuses through the container walls and tends to weaken the paper and to bleach the printing on the label. With compounds that are stable when dry but unstable when small amounts of moisture are absorbed, e.g. trichlorocyanuric acid, or when water of crystallization is lost, e.g. chlorinated trisodium phosphate, this difficulty can be partially eliminated by carefully adjusting the moisture content of the composition and packaging in moisture-proof containers. Such containers, however, are relatively expensive. Stability of dichlorocyanurate compounds, on the other hand, is much less affected by absorption of moisture from, or loss of moisture to, the atmosphere. Thus, mixtures containing these compounds are much more stable than mixtures containing prior art compounds, and may even be packaged in ordinary containers.

Although stable during manufacture and storage, the new compounds are highly efficient as sources of active chlorine, making them very desirable for use in bleaching and other applications requiring active chlorine.

The new dichlorocyanurate compounds have many uses. These include use in cellulose pulp and textile bleaching; household bleaching, sanitizing, and scouring powder preparations; constituent of laundry and dish washing detergents; disinfectants; treatment of water; preparation of disinfecting detergents for use in hospitals, restaurants, dairies, etc., soil sterilization; chlorinating agent for use in preparing other chlorinated compounds; use as chemical intermediate, additive for rubber, plastics, etc.

Dichlorocyanuric acid and its salts may be used alone in some applications, such as the treatment of water, but for many purposes it is desirable to mix them with other materials, such as soluble salts, surface active agents, etc. These materials serve to prevent caking, give desired bulk, increase effectiveness by adjusting the pH, provide a dual-purpose composition, etc.

The presence of alkaline compounds aids in the release of chlorine from dichlorocyanurate compounds and therefore renders them more effective for bleaching and other applications in which an alkaline solution of a hypochlorite is needed. A very high alkalinity, such as indicated by a pH of 12 or higher, is in general undesirable and hence when free hydroxides, such as sodium hydroxide, are used, the amount must be carefully controlled.

Alkaline salts that may be used in conjunction with dichlorocyanurate compounds include sodium pyrophosphate, sodium tripolyphosphate, trisodium phosphate, disodium phosphate, sodium carbonate, sodium bicarbonate, various sodium silicates, etc. The corresponding salts of other alkali metals, such as potassium, may be substituted for the sodium salts.

In addition to alkaline compounds of the type mentioned above, it is sometimes desirable to use neutral soluble salts to serve as a filler. Sodium sulfate is an example of a compound used for this purpose. Other neutral salts may be used in conjunction with dichlorocyanurate compounds in the formulation of neutral detergents, such as neutral dairy cleaners. Also, for some purposes insoluble materials, such as certain clays, pumice, silica, or ground feldspar or other mildly abrasive powders, may be added.

In addition to alkaline and neutral compounds of the types mentioned above, it is sometimes desirable to use acidic compounds in conjunction with dichlorocyanurate compounds, such as in the preparation of acidic cleaners. Monosodium phosphate and sodium acid pyrophosphate are examples of acidic compounds which may be used. Sodium metaphosphate, which is slightly acidic, may also be used.

The alkali metal salts which may be added to the dichlorocyanurate compounds are generally considered to enhance detergency, and may be defined as "detergency builder alkali metal salts."

The surface active agents preferred for use with dichlorocyanurate compounds are of the anionic and non-ionic types. The alkylaryl sulfonates and alkyl sulfates are examples of suitable anionic surface active agents. The polyalkylene oxide condensates are examples of non-ionic surface active agents that are suitable for use with dichlorocyanurate compounds.

The proportions of the various ingredients in the active chlorine compositions may vary over a considerable range. The dichlorocyanurate compound may constitute the major portion of the mixture, up to 90% or more of the total, or it may constitute less than one percent of the total. Ordinarily it is used in such amount as to give the total mixture an active chlorine content of 0.2% to 8%. An amount to give an active chlorine content of 4% has been found to be suitable in many compositions.

The surface active agent usually constitutes a minor part of the total mixture, in the range from less than 1% to 40%. A preferred range is 1% to 25%.

The alkaline compounds, soluble inert salts, and insoluble materials may be used separately or in combination in such proportions as to make up from less than 1% to more than 99% of the active chlorine composition.

In producing the dry active chlorine preparations, it is sometimes desirable first to make a slurry of the various constituents by adding a suitable amount of water, and then remove the free water, preferably by a spray-drying procedure. This treatment results in an intimate mixture of the ingredients and produces a free-flowing, dust-free material. The great stability of dichlorocyanuric acid in solution and when heated makes it outstandingly satisfactory for use in formulations produced by spray-drying.

Instead of making a slurry and drying it, similar compositions may be made by merely moistening the well-mixed ingredients and drying by any suitable means, such as by applying heat or allowing the added water to form a hydrate with one of the constituents. Slurrying or moistening the ingredients followed by drying produces a composition relatively free of dust and in which no separation or segregation of the constituents occurs during storage, shipment, and handling.

Dry bleach composition may also be prepared by intimately mixing the ingredients in the dry state. If desired, the mixture may be formed into tablets, briquets, pellets, or other compacted forms.

Dichlorocyanurate compounds are highly desirable constituents of detergents for use in mechanical dishwashers. In addition to a sanitizing action, they result in uniform and more complete drainage of water from dishes and other tableware, so that no spotting occurs upon drying by evaporation. The damage to plasticware and some decorative finishes on chinaware observed when certain other active chlorine compounds, such as chlorinated trisodium phosphate, are used does not occur when dichlorocyanurate compounds are employed.

The following examples illustrate the preparation and properties of dichlorocyanurate compounds, their use in the formulation of dry active chlorine compositions, the stability of the formulated compositions, and the effectiveness of these compositions in bleaching and other applications.

EXAMPLE I

Three and one-quarter (3.25) gram moles of cyanuric acid was dissolved in 3.2 liters of solution containing 6.50 gram moles (approx. 8% by weight) of sodium hydroxide. The solution was cooled to 5° C. and, while agitating, chlorine was passed in until the pH had dropped to 2.2. The time required for the chlorination was 3.5 hours. The crystals which formed during chlorination were filtered, washed, and dried at 80° C. The product weighed 523 grams, corresponding to 80.5% of the theoretical yield of dichlorocyanuric acid, and had an active chlorine content of 34.4%, compared with 35.8% calculated for dichlorocyanuric acid. After recrystallizing from acetonitrile the active chlorine content was 35.3%.

Dichlorocyanuric acid was found to have a melting point of 225–226° C. and to be soluble to the extent of about 2.6 grams per 100 grams of water at 27° C. The solubilities of cyanuric acid and of trichlorocyanuric acid are, respectively, 0.13 and about 1.2 grams per 100 grams of water at approximately the same temperature.

The X-ray diffraction pattern obtained for crystals of dichlorocyanuric acid was distinct from that of either cyanuric acid or trichlorocyanuric acid and had the characteristics of a pattern for a single molecular species.

EXAMPLE II

To 1.98 grams (0.01 mole) of dichlorocyanuric acid dissolved in 10 milliliters of acetonitrile there was added 10 milliliters of 1.0 N sodium hydroxide solution (0.01 mole NaOH). The clear solution which resulted was evaporated to dryness under vacuum at room temperature and the residue was then dried at 80° C. for 30 minutes. The product contained 31.5% active chlorine compared with the theoretical value of 32.3% for monosodium dichlorocyanurate. The solubility of the monosodium salt was found to be 28.4 grams per 100 grams of water at 27° C.

EXAMPLE III 672 grams of dichlorocyanuric acid having an active chlorine content of 34.8% were intimately mixed with 136 grams of sodium hydroxide powder having an assay of 97.2%. The resulting dry mixture was added with good agitation to 3000 grams of water at 25° C. The resulting solution, having a solids content of 19.6% was spray-dried. The spray dried product was a white granular material containing 30.2% active chlorine and 1.5% moisture, representing a 98% recovery of total chlorine fed. Calcd. for $C_3N_3O_3Cl_2Na$, 32.2% active chlorine.

EXAMPLE IV

To 1.98 grams (0.01 mole) of dichlorocyanuric acid slurried in 10 milliliters of water there was added 10 milliliters of 1.0 N sodium hydroxide solution (0.01 mole NaOH), thereby forming a solution of monosodium dichlorocyanurate. To this solution, a solution containing 1.22 grams barium chloride dihydrate (0.005 mole) was added. A precipitate formed slowly over a period of 30 minutes, and was filtered off and dried at 80° C. for 30 minutes. The weight of the product corresponded to 61% of the theoretical yield of barium dichlorocyanurate and had an active chlorine content of 28.1%, compared with the theoretical value of 26.7% for the barium salt. The solubility of the barium salt was found to be 1.55 grams per 100 grams of water at 27° C.

EXAMPLE V

The potassium, lithium, calcium, and magnesium salts of dichlorocyanuric acid were prepared by procedures similar to that in Example II. Potassium hydroxide, lithium hydroxide, calcium oxide (in slurry form), and magnesium oxide (in slurry form), respectively, were used as the source of the metal ion in these compounds. The solubilities of these salts, in grams per 100 grams of water at 27° C., were found to be as follows:

Potassium dichlorocyanurate _____ 11.5
Lithium dichlorocyanurate _____ 24.0
Calcium dichlorocyanurate _____ 22.6
Magnesium dichlorocyanurate _____ 8.3

EXAMPLE VI

Bleach products containing 4% active chlorine were prepared by dry mixing each of sodium dichlorocyanurate, dichlorocyanuric acid, trichlorocyanuric acid, and dichlorodimethylhydantoin in appropriate ratio with a commercial spray-dried detergent containing approximately 30% tetrasodium pyrophosphate, 6% sodium alkylarylsulfonate, and 64% sodium sulfate. The resulting compositions were added to vigorously agitated water at room temperature to give 125 parts per million active chlorine. Samples were withdrawn after ½, 1, and 15 minutes, filtered at once, and tested for active chlorine content. The results were as follows:

|  | P.p.m. Active Chlorine | | |
|---|---|---|---|
|  | ½ minute | 1 minute | 15 minutes |
| Sodium dichlorocyanurate | 121 | 122 | 126 |
| Dichlorocyanuric acid | 94 | 120 | 122 |
| Trichlorocyanuric acid | 86 | 102 | 114 |
| Dichlorodimethylhydantoin | 29 | 47 | 109 |

These results show that sodium dichlorocyanurate and dichlorocyanuric acid dissolve rapidly enough to make 96–98% of their active chlorine content accessible within one minute, whereas in the case of dichlorodimethylhydantoin, less than 45% is accessible even after one minute.

EXAMPLE VII

Dry bleach and detergent compositions containing 4% active chlorine were prepared by formulating dichlorocyanuric acid (DCCA), sodium dichlorocyanurate (NaDCC), trichlorocyanuric acid (TCCA), and dichlorodimethylhydatoin (DCDMH) with various alkali metal salts and other materials. After standing for a number of days at room temperature each sample was analyzed and the percentage of chlorine lost was calculated. The formulations and the percentages of chlorine lost were as follows:

TABLE 1

| Mixture and Time of Standing | Percent Chlorine Lost | | | |
|---|---|---|---|---|
|  | DCCA | NaDCC | TCCA | DCDMH |
| A—14 days | 0 | ---------- | 8.9 | 12.2 |
| A—42 days | 0 | 12.4 | 23.1 | 58.4 |
| B—14 days | 0 | 0 | 23.7 | 1.7 |
| C—35 days | 1.5 | 0 | 8.4 | ---------- |
| D—3 days | 3.7 | 0.4 | 23.4 | ---------- |

Mixture A—Formulated with trisodium phosphate.
Mixture B—Formulated with a salt-surfactant mixture containing approximately 30 parts by weight tetrasodium pyrophosphate, 6 parts sodium alkylarylsulfonate (Ultrawet K), and 55 parts sodium sulfate.
Mixture C—Formulated with trisodium phosphate and sodium lauryl sulfate to give a composition containing approximately 10 parts DCCA or TCCA, 84 parts trisodium phosphate, and 6 parts sodium lauryl sulfate (Duponol ME).
Mixture D—Formulated to give a composition containing approximately 10 parts DCCA or TCCA, 30 parts tetrasodium pyrophosphate, 56 parts sodium sulfate, and 4 parts polyalkylene oxide condensate (Pluronic F-68; a non-ionic surface active agent).

EXAMPLE VIII

A dry, stable bleach composition containing 3% active chlorine was prepared by mixing 15.4 parts of a spray dried sodium dichlorocyanurate-sodium chloride product with 38 parts of partially hydrated tetrasodium pyrophosphate (30 parts anhydrous tetrasodium pyrophosphate), 6 parts of sodium alkylaryl sulfonate, and 40.6 parts of sodium sulfate. The sodium dichlorocyanurate-sodium chloride product was obtained by neutralizing to pH 8.0 with sodium hydroxide a chlorination slurry (preparation batch) of dichlorocyanuric acid and then spray drying the entire mixture. The spray dried product assayed 19.5% active chlorine and contained about 37% sodium chloride.

EXAMPLE IX

Samples of chlorinated cyanuric acid containing from 4% to 45% active chlorine (mixture of cyanuric and dichlorocyanuric acid, or dichloro-and trichlorocyanuric acid) were prepared by the general procedure described in Example I. Compositions containing 3% active chlorine were prepared by adding portions of these samples to a dry mixture containing approximately 30 parts tetrasodium pyrophosphate, 6 parts alkylaryl sulfonate, and 55 parts sodium sulfate. Each sample was then formed into a slurry by adding an equal weight of water, the slurry was allowed to stand 30 minutes at room temperature, and the percentage of the chlorine initially present which had been lost during this period was then determined. The results are shown in numerical form in Table 2 and in graphical form in FIGURE 1. The data show that dichlorocyanuric acid alone or mixed with unchlorinated cyanuric acid has good stability, while trichlorocyanuric acid alone or mixed with dichlorocyanuric acid has poor stability.

TABLE 2

| Active Chlorine in Chlorinated Cyanuric acid, percent | Active Chlorine Lost from Slurry in 30 min. percent |
| --- | --- |
| 4.1 | 1.3 |
| 9.9 | 1.3 |
| 17.3 | 2.7 |
| 19.4 | 1.0 |
| 22.2 | 1.7 |
| 24.8 | 3.3 |
| 25.5 | 1.6 |
| 27.6 | 0.0 |
| 29.5 | 1.4 |
| 34.2 | 1.7 |
| 35.1 | 1.3 |
| 35.4 | 0.6 |
| 37.5 | 5.7 |
| 40.0 | 12.6 |
| 44.6 | 32.6 |
| 44.8 | 29.0 |

The procedure was repeated with sodium dichlorocyanurate substituted for the chlorinated cyanuric acid, the active chlorine content of the composition being 3% as before. The loss of active chlorine from the slurry in 30 minutes was only 0.7% of the total.

EXAMPLE X

Two mixtures were made from chlorinated cyanuric acid, trisodium phosphate, and sodium sulfate in such proportions as to form compositions containing 3% active chlorine, 6% trisodium phosphate (TSP), and the balance sodium sulfate. The chlorinated cyanuric acid in one sample contained 35% active chlorine, corresponding to dichlorocyanuric acid and that used in the other contained 44%, corresponding to trichlorocyanuric acid. Each sample was mixed with an equal weight of water to form a 50% slurry, and after standing for 30 minutes at room temperature was analyzed for active chlorine. The results are shown in Table 3.

The above procedure was repeated using tetrasodium pyrophosphate (TSPP) as the alkaline salt. The ingredients were proportioned so as to form compositions containing 3% active chlorine, 32% tetrasodium pyrophosphate, and the balance sodium sulfate. The results are shown in Table 3.

This procedure was repeated using sodium carbonate ($Na_2CO_3$) as the alkaline salt. The ingredients were proportioned so as to form compositions containing 3% active chlorine, 6% sodium carbonate, and the balance sodium sulfate. The results are shown in Table 3.

TABLE 3

| Alkaline Salt | Active Chlorine in Chlorinated Cyanuric Acid, Percent | Loss of Chlorine Based on Amount Initially Present, Percent |
| --- | --- | --- |
| TSP | 35 | 2.3 |
| TSP | 44 | 33.6 |
| TSPP | 35 | 1.0 |
| TSPP | 44 | 33.5 |
| $Na_2CO_3$ | 35 | 2.7 |
| $Na_2CO_3$ | 44 | 33.6 |

EXAMPLE XI

Trichlorocyanuric acid (containing 44.4% active chlorine) was added, in amount to give 4% active chlorine in the resulting composition, to a mixture of approximately 30 parts by weight tetrasodium pyrophosphate, 6 parts of an alkylarylsulfonate, and 55 parts of sodium sulfate. This mixture was added to water in the proper amount to form a slurry containing 40% solids by weight, with the intention of spray-drying the slurry. The slurry gave off so much chlorine that the workmen were driven from the building and the attempt to spray-dry the material had to be abandoned.

EXAMPLE XII

The procedure described in Example XI was repeated using dichlorocyanuric acid (containing 35.1% active chlorine) in place of trichlorocyanuric acid, the amount being adjusted to give 4% active chlorine based on total solids. No evolution of chlorine was observed either upon forming the slurry or during the spray-drying operation.

The procedure was repeated, first, with omission of the surface active agent, and, secondly, with omission of the surface active agent and with sodium tripolyphosphate substituted for tetrasodium pyrophosphate. The results were the same, with no evolution of chlorine at any stage.

EXAMPLE XIII

The procedure described in Example XI was repeated with dichlorodimethylhydantoin substituted for the trichlorocyanuric acid in proper amount to give 4% active chlorine based on total solids. Evolution of chlorine from the slurry at room temperature was not observed, but when spray-drying was attempted, chlorine was evolved in such amounts that it was necessary to stop the operation.

EXAMPLE XIV

A solution containing approximately 22% of sodium dichlorocyanurate was prepared by dissolving an equimolar mixture of dichlorocyanuric acid (32.0 grams) and powdered sodium hydroxide (6.5 grams) in water (120 grams). The solution was mixed with a slurry of tetrasodium pyrophosphate (84 grams), sodium alkylarylsulfonate (16.8 grams), and sodium sulfate (140.7 grams) in water (300 grams), and the combined mixture was spray dried to give a dry bleach composition containing about 4% active chlorine. No significant evolution of chlorine was observed either upon forming the slurry or during the spray drying operation.

EXAMPLE XV

Swatches of cotton cloth were stained with an alcoholic extract of green grass and then subjected to Launder-O-Meter testing at 140° F. with detergent solutions with and without bleach agents. The results are tabulated below. All solutions employed contained 0.1% of a commercial heavy-duty detergent. All except the first contained 50 parts per million of active chlorine, supplied by the indicated compound. The figures in the second column are the percent restoration of the original (unstained cloth) reflectance effected by the washing treatment.

TABLE 4

| | |
|---|---|
| Detergent only | 58, 48 |
| Detergent and dichlorodimethylhydantoin | 69 |
| Detergent and dichlorocyanuric acid | 96, 97 |
| Detergent and sodium dichlorocyanurate | 96 |
| Detergent and trichlorocyanuric acid | 97 |

These results indicate that the addition of a dichlorocyanurate compound greatly improves the stain-removing effectiveness of the detergent, and that these compounds are equal in effectiveness to trichlorocyanuric acid and superior to dichlorodimethylhydantoin.

The same relative results in bleaching cotton cloth stained with an alcoholic grass extract were obtained when the detergent solution contained 38 parts per million active chlorine rather than 30 parts. Further, in bleaching unbleached muslin with detergent solutions containing 38 parts per million active chlorine, the relative efficiencies of dichlorocyanuric acid, trichlorocyanuric acid, and dichlorodimethylhydantoin were the same as in bleaching cloth stained with the grass extract.

EXAMPLE XVI

A dry active chlorine composition was prepared by mixing together 1.5 parts of dichlorocyanuric acid, 58.5 parts sodium tripolyphosphate, and 40 parts sodium metasilicate pentahydrate. This composition is stable with respect to the active chlorine content and is suitable for use as a detergent, drainage promoting agent, and sterilizing agent in mechanical dishwashing.

Another active chlorine composition was prepared by mixing together 1.5 parts of dichlorocyanuric acid containing 35% active chlorine, 50 parts sodium tripolyphosphate, and 48.5 parts sodium carbonate. This composition also is stable with respect to the active chlorine content and is suitable for use as a detergent, and sterilizing and drainage-promoting agent in mechanical dishwashing.

EXAMPLE XVII

Dry compositions suitable for use in automatic dishwashers and containing 1.5% active chlorine were prepared and tested as follows:

| Active Chlorine Compound | NaDCC | DCCA | DCDMH |
|---|---|---|---|
| Sodium Metasilicate, parts | 4.3 | 4.3 | 4.3 |
| Sodium Tripolyphosphate, parts | 48.0 | 48.0 | 48.0 |
| Sodium Carbonate, parts | 42.7 | 43.4 | 43.2 |
| Active Chlorine Compound, parts | 5.0 | 4.3 | 4.5 |
| Active Chlorine in Mixture, percent | 1.5 | 1.5 | 1.5 |
| Loss of active chlorine in 14 days, percent | 0 | 8.4 | 49.0 |
| Loss of active chlorine in 42 days, percent | 0 | 11.1 | (1) |

[1] Approx. 70.

These data clearly show the superiority of sodium dichlorocyanurate (NaDCC) and dichlorocyanuric acid (DCCA) over the prior art dichlorodimethylhydantoin (DCDMH) in this type of composition.

Other compositions suitable for automatic dishwashers and including sodium dichlorocyanurate are listed in the following table.

| | a | b | c | d | e |
|---|---|---|---|---|---|
| Sodium dichlorocyanurate | 1.9 | 1.9 | 1.9 | 5.0 | 3.4 |
| Sodium silicate ($Na_2O.2SiO_2$) | 5.0 | 5.0 | | | 5.0 |
| Sodium silicate ($Na_2SiO_3$) | | | 5.0 | 4.4 | |
| Sodium tripolyphosphate | 48.0 | | | 48.0 | 50.0 |
| Tetrasodium pyrophosphate | | 48.0 | 93.1 | | |
| Soda Ash | 45.1 | 45.1 | | 42.6 | 40.6 |
| Polyalkylene Oxide Condensate Surfactant (Pluronic F-68) | | | | | 1.0 |

EXAMPLE XVIII

Dry compositions suitable for use in automatic dishwashers and containing 0.5 or 1.0% active chlorine were prepared by formulating dichlorocyanuric acid (DCCA), sodium dichlorocyanurate (NaDCC), trichlorocyanuric acid (TCCA), and chlorinated trisodium phosphate (CL-TSP) with various alkali metal salts. These compositions were subject to an accelerated test at 40° C. and the percentage of chlorine lost during 7 days was determined. The formulations and percentages of chlorine lost were as follows:

TABLE 5

| Mixture | Percent Chlorine Lost in 7 days, 40° C. | | | |
|---|---|---|---|---|
| | DCCA | NaDCC | TCCA | CL-TSP |
| A | 7.0 | 1.0 | 11.0 | 56.0 |
| B | 1.5 | 7.0 | 14.0 | 31.5 |
| C | 6.0 | 2.0 | 13.0 | 26.0 |

Mixture A—Formulated to contain 0.5% active chlorine. 10% sodium silicate ($Na_2O.2SiO_2$), 40% commercial sodium hexametaphosphate, and the balance sodium carbonate.
Mixture B—Same as A but with 1.0% active chlorine.
Mixture C—Formulated to contain 0.5% active chlorine, 5% sodium silicate ($Na_2O.2SiO_2$), 48% sodium tripolyphosphate, and the balance sodium carbonate.

EXAMPLE XIX

Dry compositions suitable for use in automatic dishwashers and containing 1% active chlorine were prepared by formulating dichlorocyanuric acid (DCCA) and trichlorocyanuric acid (TCCA) with 10% sodium silicate ($Na_2O \cdot 2SiO_2$), 48% sodium tripolyphosphate, and the balance sodium carbonate. After standing for 14 weeks at room temperature each sample was analyzed and the percentage of chlorine lost was calculated. It was found that the sample containing TCCA had lost 50% of the active chlorine while the sample containing DCCA had lost only 2%.

EXAMPLE XX

Dry compositions suitable for use in automatic dishwashers and containing 1.5% active chlorine were prepared by formulating dichlorocyanuric acid (DCCA) and dichlorodimethylhydantoin (DCDMH) with 4.3% anhydrous sodium metasilicate, 48% sodium tripolyphosphate and the balance sodium carbonate. After standing for 11 days at room temperature each sample was analyzed and the percentage of chlorine lost was calculated. It was found that the sample containing DCDMH had lost 44% of the active chlorine while the sample containing DCCA had lost no detectable amount.

EXAMPLE XXI

A series of standardized dishwashing tests was carried out in which 10 clean water glasses were placed in an automatic dishwasher during 5 washing cycles of standard soiled dinner plates. At the end of the 5 cycles the glasses were removed and examined for water spots and film. Based on ability to prevent water spots and film formation on the glasses, a formulation comprising 0.7% dichlorocyanuric acid, 20% sodium silicate $$(Na_2O \cdot 3 \cdot 22SiO_2)$$

54% sodium tripolyphosphate, and 24.6% sodium carbonate was superior to a commercial dishwashing composition containing chlorinated trisodium phosphate and far superior to a commercial dishwashing composition containing no oxidizing agent. The above dichlorocyanuric acid formulation was also far superior to an identical composition containing dichlorodimethylhydantoin.

EXAMPLE XXII

Several scouring powder formulations were prepared using dichlorocyanuric acid and sodium dichlorocyanurate as shown in the following table. Cleaning ability and storage stability are excellent.

|  | Percent | | |
|---|---|---|---|
|  | a | b | c |
| Sodium dichlorocyanurate | 10 | 10 | 10 |
| Sodium alkylaryl sulfonate |  | 30 | 30 |
| Powdered NaOH | 10 |  |  |
| Sodium silicate ($Na_2O \cdot 2SiO_2$) | 10 |  |  |
| Sodium Metasilicate ($Na_2O \cdot SiO_2$) |  |  | 30 |
| Sodium tripolyphosphate | 50 | 30 | 30 |
| Sodium acid pyrophosphate |  | 30 |  |
| Sodium carbonate | 20 |  |  |

|  | Percent | | | | | | | |
|---|---|---|---|---|---|---|---|---|
|  | a | b | c | d | e | f | g | h |
| Dichlorocyanuric acid | 1.0 |  |  |  |  | 0.25 | 2.0 | 2.0 |
| Sodium dichlorocyanurate |  | 3.0 | 2.0 | 1.0 | 1.0 |  |  |  |
| 88% Sodium Alkaryl Sulfonate (Ultrawet K) | 5.0 | 5.0 |  | 5.0 | 5.0 |  | 5.0 |  |
| Sodium Lauryl Sulfate |  |  |  |  |  | 2.0 |  |  |
| Powdered Soap |  |  | 4.0 |  |  |  |  | 4.0 |
| Sodium tripolyphosphate | 5.0 | 5.0 |  | 5.0 | 5.0 | 5.0 | 5.0 |  |
| Powdered Pumice | 89.0 | 87.0 | 54.0 |  |  |  | 88.0 | 54.0 |
| Powdered Feldspar |  |  |  |  | 89.0 |  |  |  |
| Diatomaceous earth |  |  |  | 89.0 |  |  |  |  |
| Powdered silica |  |  |  |  |  | 92.75 |  |  |
| Trisodium Phosphate |  |  | 40.0 |  |  |  |  | 40.0 |

EXAMPLE XXIII

A highly active sanitizing composition suitable for dairy and restaurant use was prepared by mixing together 90 parts of dichlorocyanuric acid, 5 parts trisodium phosphate, and 5 parts sodium sulfate. This composition, containing approximately 32% active chlorine, was of excellent storage stability. A similar composition with good stability and very high solubility in water, containing sodium dichlorocyanurate in place of dichlorocyanuric acid, was also prepared.

EXAMPLE XXIV

Antibacterial activity of dichlorocyanuric acid was tested by the "available chlorine germicidal equivalent method" of the Association of Official Agricultural Chemists (Official Methods of Analysis, 8th Edition). Test organisms used were Salmonella typhosa and micrococcus pyogenes (staphylococcus aureus). Results showed that dichlorocyanuric acid is about equal to calcium hypochlorite and far superior to dichlorodimethylhydantoin in effectiveness towards these organisms, which are typical of those responsible for fecal contamination or for skin infections. These results indicate the possibility of superior performance in such applications as water treatment, sewage disposal, laundering operations, surface sterilization, etc.

EXAMPLE XXV

Dry compositions suitable for use as industrial or dairy cleaners were prepared with sodium dichlorocyanurate as follows:

Similar compositions containing dichlorocyanuric acid in place of sodium dichlorocyanurate were also prepared.

EXAMPLE XXVI

Dry compositions suitable for use as commercial laundry bleaches were prepared with dichlorocyanuric acid or sodium dichlorocyanurate as follows:

|  | Percent | | | | | | |
|---|---|---|---|---|---|---|---|
|  | A | B | C | D | E | F | G |
| Dichlorocyanuric Acid | 30 |  | 29 | 29 | 50 |  |  |
| Sodium Dichlorocyanurate |  | 30 |  |  |  | 50 | 10 |
| Tetrasodium Pyrophosphate | 70 | 70 | 42 |  |  |  |  |
| Sodium Acid Pyrophosphate |  |  |  | 42 |  |  |  |
| Sodium Tripolyphosphate |  |  |  |  |  |  | 25 |
| Disodium Phosphate |  |  |  |  |  | 50 |  |
| Monosodium Phosphate |  |  |  |  | 50 |  |  |
| High Titer Soap |  |  |  |  |  |  | 25 |
| Sodium Silicate ($NaO \cdot 2SiO_2$) |  |  | 29 | 29 |  |  | 10 |
| Sodium Carbonate |  |  |  |  |  |  | 30 |

Although other N-chlorinated imides have been proposed before for use in applications such as bleaching and sterilizing, the foregoing examples show clearly that the dichlorocyanurate compounds are unique, even within this class of chemical compounds, because of their ability to retain their active chlorine in mixture with other substances, and yet to release this active chlorine for useful purposes such as bleaching, film and spot prevention, sterilizing and disinfecting, chlorinating, etc., when needed.

In the above examples active chlorine was determined by the usual procedure of adding a sample of the material being analyzed to potassium iodide and titrating the liberated iodine with standard sodium thiosulfate solution.

The invention can obviously be practiced using other examples than those indicated, and is limited only by the claims herein.

That which is claimed as patentably novel is:

1. A substantially dry, active-chlorine-yielding composition characterized by its storage stability in the dry state, and by its ability to rapidly make available its entire content of active chlorine for bleaching and sanitizing purposes on admixture of the composition with sufficient water to dissolve its active ingredients, comprising (1)

sufficient material from the class consisting of dichlorocyanuric acid and its sodium, potassium, lithium, calcium and magnesium salts to yield from 0.5% to 30% active chlorine, and (2) a detergency builder alkali metal salt.

2. A dry laundry bleach characterized by its storage stability in the dry state, and by the availability of substantially all its active chlorine within one minute after addition to agitated water in normal laundry usage, comprising (1) sufficient material from the class consisting of dichlorocyanuric acid and its sodium, potassium, lithium, calcium and magnesium salts to yield from 3.0% to 30% active chlorine, and (2) a detergency builder alkali metal salt.

3. A substantially dry, stable, active-chlorine yielding composition consisting essentially of potassium dichlorocyanurate, a water-soluble, alkaline, alkali metal detergent builder salt in an amount sufficient to stabilize the composition and a minor amount of an anionic, organic surface active agent.

4. A substantially dry, stable, active-chlorine yielding composition consisting essentially of dichlorocyanuric acid and a water-soluble alkaline, alkali metal detergent builder salt in an amount sufficient to stabilize the composition against decomposition in the presence of moisture.

5. A substantially dry, stable, active-chlorine yielding composition consisting essentially of dichlorocyanuric acid and a water soluble salt selected from the group consisting of alkali metal carbonates and alkali metal silicates in an amount sufficient to stabilize the dichlorocyanuric acid.

References Cited

UNITED STATES PATENTS

| | | | |
|---|---|---|---|
| 1,650,124 | 11/1927 | Gunzler et al. | 252—187 |
| 1,894,539 | 1/1933 | Mirau | 252—187 |
| 2,171,901 | 9/1939 | Wilson et al. | 260—248 |
| 2,430,233 | 11/1947 | Magill | 252—187 |
| 2,438,781 | 3/1949 | Kamlet | 252—187 X |
| 2,480,579 | 8/1949 | Holuba | 252—138 |
| 2,515,577 | 7/1950 | Waldeck | 252—138 |
| 2,578,270 | 12/1951 | Strain | 252—187 |
| 2,607,738 | 8/1952 | Hardy | 252—99 |
| 2,795,556 | 6/1957 | Quinn | 252—187 |

FOREIGN PATENTS

| | | |
|---|---|---|
| 634,801 | 11/1950 | Britain. |

OTHER REFERENCES

Chattaway et al., J. Chem. Soc. (London), vol. 81, p. 200 (1902). (Copy in Sci. Lib.).

LEON D. ROSDOL, *Primary Examiner.*

J. GREENWALD, F. C. EDMUNDSON, A. T. MEYERS, *Examiners.*